United States Patent [19]
Granfield

[11] 3,712,174
[45] Jan. 23, 1973

[54] MATERIAL REMOVAL DEVICE

[75] Inventor: John S. Granfield, 295 Laurel Hill Road, Norwich, Conn. 06360

[22] Filed: Jan. 6, 1971

[21] Appl. No.: 104,288

[52] U.S. Cl............................90/12, 90/12 D, 82/4 C
[51] Int. Cl................................................B23c 1/20
[58] Field of Search....................90/12, 12 D; 82/4 C

[56] References Cited

UNITED STATES PATENTS

| | | | |
|---|---|---|---|
| 1,773,096 | 8/1930 | Cousineau | 30/94 |
| 1,029,584 | 6/1912 | Berghausen | 82/4 C |
| 3,132,563 | 5/1964 | Barnum | 90/12 |
| 3,131,599 | 5/1964 | MacFarlane et al. | 90/12 |

*Primary Examiner*—Leonidas Vlachos
*Attorney*—Fishman & Van Kirk

[57] ABSTRACT

A material removal device including a clamp mechanism for engaging the work or a support extending therefrom by means of eight precision ground surfaces oriented along four parallel lines. The work engaging surfaces are defined by the exterior radial surfaces of two pair of precision bearings mounted on each of a pair of opposed jaw members, the jaw members being movable relative to one another and to the axis of rotation of a cutting tool.

2 Claims, 3 Drawing Figures

MATERIAL REMOVAL DEVICE

BACKGROUND OF THE INVENTION

1. Field of the Invention

The present invention relates to the mechanical removal of material. More specifically, this invention is directed to rotary cutting apparatus characterized by high degrees of reliability, flexibility and utility. Accordingly, the general objects of the present invention are to provide novel and improved methods and apparatus of such character.

2. Description of the Prior Art

While not limited thereto in utility, as will be discussed in greater detail below, the present invention is particularly well suited for employment as a pipe preparation tool. Thus, by way of example, this invention may be employed for cutting bevels on the edge of a pipe preparatory to the formation of a welded pipe joint. There are, of course, lathe type tools or systems which have been employed in the treating of workpieces such as pipes in the shop environment. There have also been portable machines proposed, and in some cases actually fabricated, for use in the field to remove material from a workpiece such as, for example, in the formation of a bevel at the end of a length of pipe protruding from a bulkhead.

Prior art portable tools for use in the removal of material from a workpiece, and particularly those adaptable for the preparation of pipe ends, have been characterized by one or more deficiencies. Perhaps the best known of these deficiencies is the relative high cost of the equipment; the cost being attributed to the equipment complexity incident to achieving a reasonable degree of accuracy and repeatability. A second deficiency, obviously allied to the expense and complexity of prior art apparatus potentially competitive with the present invention, is comparatively large size and heavy weight; both of these characteristics increasing the difficulty of use of the devices and imposing limitations on the number of potential uses. Thus, again by way of example, prior art portable pipe preparation tools have not been capable of use in the forming of desired configurations at the ends of immobile pipes having an outer diameter of less than 2 inches. It is also to be observed that most prior art pipe preparation tools were extremely difficult to use in cases where the workpiece was oriented other than horizontally to the ground. A further deficiency of prior art apparatus is the relatively high degree of operator skill required due, in part, to the necessity of properly adjusting feed and speed controls. Most prior art apparatus employs either an electric motor for the purpose of driving the cutting tool or electric controls thereby also adding the risk of shock hazard with the inherent reluctance of operators to employ the equipment in damp or wet areas.

SUMMARY OF THE INVENTION

The present invention overcomes the above-discussed and other deficiencies and limitations of the prior art by providing a novel material removal device. The present invention employs a high speed air motor to drive a cutting tool. Through the use of a unique, adjustable clamping mechanism, the position of the workpiece relative to the cutting tool is easily and precisely adjusted; the clamping mechanism and air motor being rigidly supported adjacent oppositely disposed ends of a compact frame. The clamping mechanism of the present invention comprises at least four pair of bearings which present precision ground work engaging surfaces and the entire apparatus may be rotated about an immobile workpiece on these bearings. Rotation of the invention is facilitated by employing the compact supporting frame as a handle during a material removal operation. The work engaging or clamp mechanism portion of the present invention is provided with dual adjustment means whereby the size of the workpiece may be selected at will and the radial position of the workpiece relative to the axis of rotation of the cutting tool may be adjusted.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
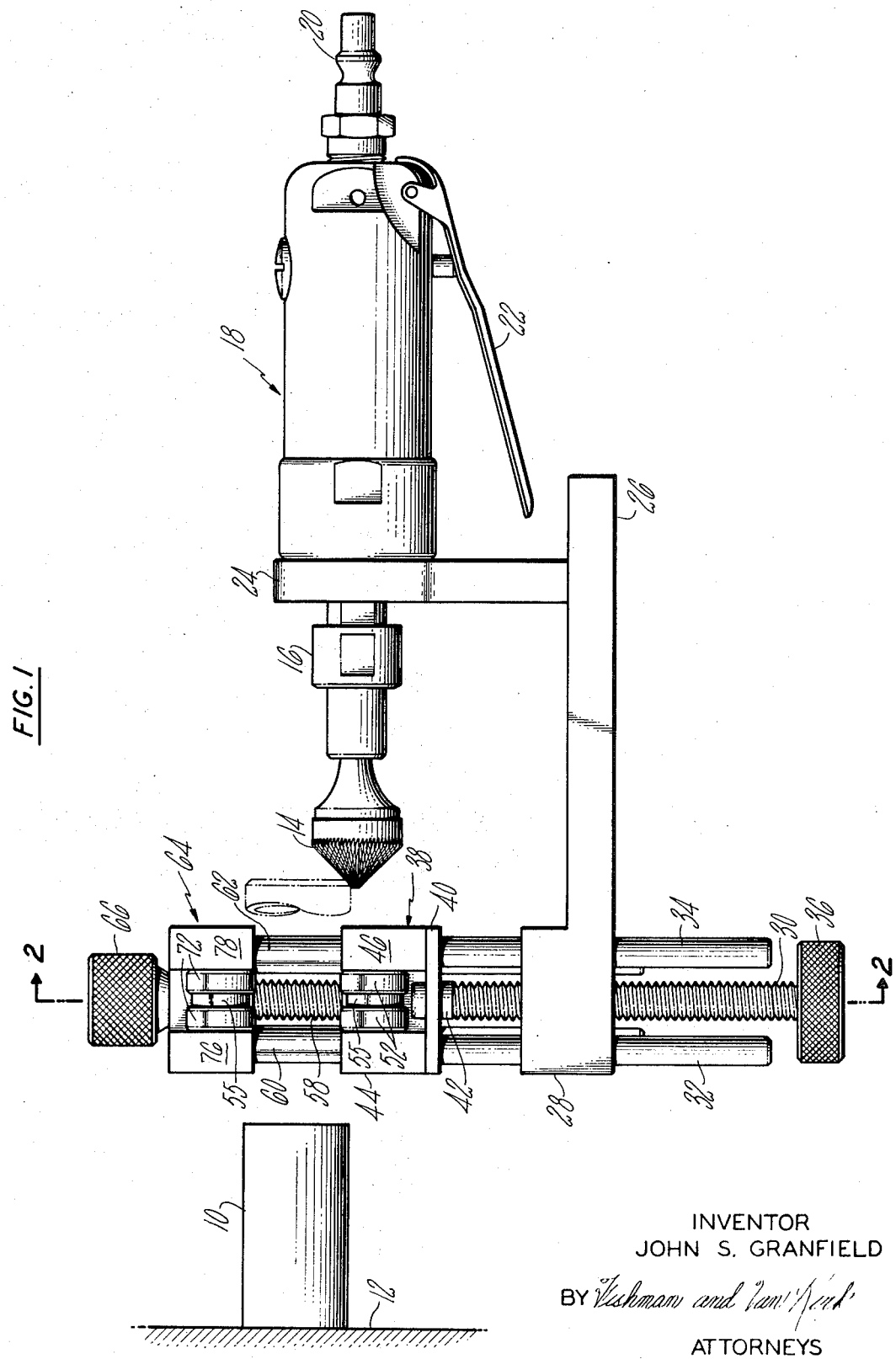
FIG. 1 is a side elevation view of a preferred embodiment of the present invention.

With reference now to FIG. 1, a small diameter pipe 10 which is to be prepared for a welding operation is shown extending from a bulkhead 12. As shown in phantom, it may be desired to form a bevelled outer edge at the end of pipe 10 while simultaneously insuring that the end of the pipe is perpendicular to its axis about the entire circumference.

The removal of material from the end of pipe 10 in the preparation operation is performed with a cutting tool 14 having the required configuration. Cutting tool 14 will comprise a head or cutting portion, typically formed from a carbide material, and a rearwardly extending shaft portion. The shaft will typically be formed of steel and the cutting head will be affixed thereto by means well known in the art.

Cutting tool 14 is held in a collet 16 of conventional design. Collet 16 will, in turn, be rigidly mounted on the output shaft of a high speed air motor indicated generally at 18. In one embodiment of the invention, motor 18 operated at a speed of 35,000 rpm and operation of the invention depended upon very light chip loading. Driving fluid for motor 18 will be delivered from a pressurized source, not shown, via a disconnect fitting 20. Operation of the motor is under the command of a handle 22 which controls a valve internally of the housing of motor 18. Latch means, not shown, will usually be employed to enable handle 22 to be locked in the "on" position.

Motor 18 is supported, by means of a mounting bracket 24, from a main frame member 26. Any conventional means may be employed to rigidly support motor 18 from bracket 24 and, in a typical example, bracket 24 is internally threaded so as to accept complementary threads on the exterior of an extension of the housing of motor 18. Bracket 24 is oriented perpendicularly to frame member 26 and may be rigidly attached thereto by welding or through the use of support screws, not shown. Alternatively, bracket 24 and frame member 26 may comprise an integral casting.

The end 28 of main frame member 26 located remotely from bracket 24 is enlarged and is provided with a plurality of precisely bored holes. The axes of these holes are parallel to mounting bracket 24 and thus the holes are perpendicular to a horizontal plane through the axis of rotation of cutting tool 14. In the embodiment being described, end 28 of main frame member 26 is provided with three aligned holes. The center hole is threaded and receives a "cutter assembly" feed screw 30. A pair of unthreaded guide rods 32 and 34 pass through the unthreaded holes to either side of the hole which accepts screw 30.

The outwardly exposed end of screw 30 is provided with a knurled adjustment knob 36 while the other end of screw 30 has an unthreaded portion 42. The unthreaded end of screw 30 engages, in the manner to be described below, a first guide mechanism indicated generally at 38.

Figure 2:
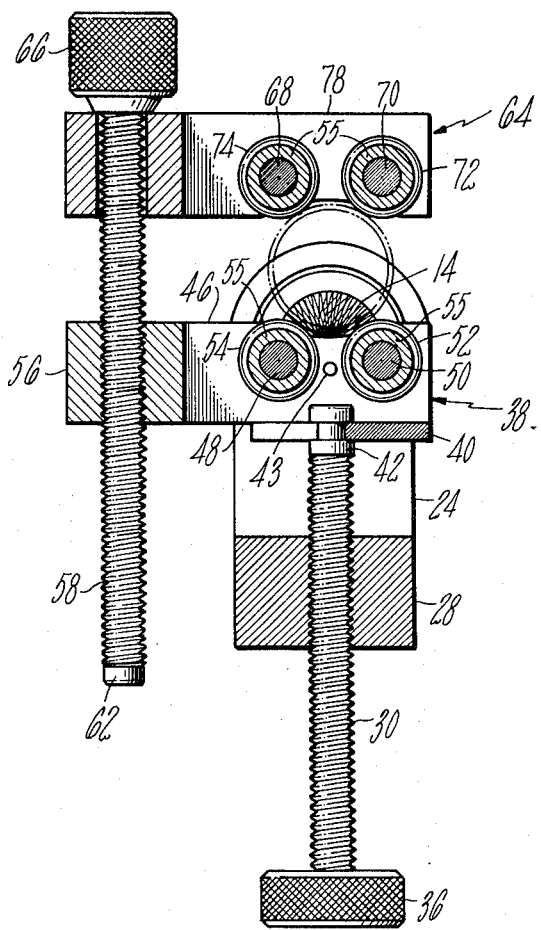
FIG. 2 is a cross-sectional view, taken along line 2—2, of the embodiment of FIG. 1.

As may best be seen from FIG. 2, the unthreaded portion 42 of screw 30 is provided with a circular groove. The connection between adjustment screw 30 and guide mechanism 38 is achieved by capturing the groove in the unthreaded end 42 of screw 30 in a slot which is provided in a base plate 40 of the guide mechanism. Employment of this means of connecting the adjustment screw to the guide mechanism enables turning of screw 30 in either the clockwise or counter-clockwise direction without disengagement of the feed screw from the guide mechanism. The guide rods 32 and 34 are pinned, as by pin 43, to the guide mechanism 38 at their inwardly disposed ends.

Guide mechanism 38 comprises, in addition to base plate 40, a pair of parallel bearings support members 44 and 46. As may best be seen from a joint consideration of FIGS. 1 and 2, support members 44 and 46 extend outwardly from base plate 40. Referring to FIG. 2, members 44 and 46 are provided with aligned holes which receive bearing guide pins 48 and 50. Two pairs, of bearings 52—52 and 54—54 are respectively mounted, between members 44 and 46, on pins 48 and 50 and are separated by spacers 55 (FIG. 1). Bearing guide pins 48 and 50 are retained by any suitable means in the aligned holes in support members 44 and 46. The bearing support members 44 and 46 are also provided with recessed portions whereby the bearings 52 and 54 extend above the surface of the members as shown in FIG. 2. The bearings 52 and 54 may, for example, comprise precision ball bearings such as Fafnir Type S1KDD7. Bearings 52 and 54 provide four precision ground radial surfaces for contacting the workpiece 10.

Figure 3:
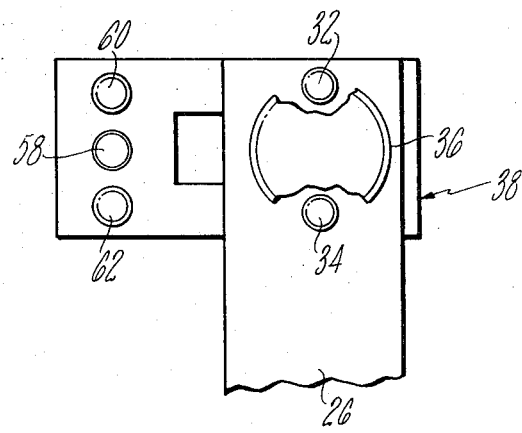
FIG. 3 is a partial end view of the apparatus as shown in FIG. 2.

The outwardly disposed ends of members 44 and 46 are bridged by a member 56 which also comprises a part of the guide mechanism 38. It is, of course, to be understood that members 44, 46 and 56 will usually be machined from a single piece of stock. Member 56 is provided with a plurality of holes arranged identically to the holes in end 28 of main support frame 26. These holes receive a threaded "pipe clamp feed and lock" screw 58 and a second pair of guide rods 60 and 62. The orientation of rods 60 and 62 and screw 58 may best be seen from a joint consideration of FIGS. 2 and 3. As may be seen from FIG. 2, the thread on adjustment screw 58 engages a complementary thread on member 56.

A second guide mechanism, indicated generally at 64, is mounted on guide rods 60 and 62. Guide mechanism 64 is identical to guide mechanism 38 with the exception that the ends of guide rods 60 and 62 are locked in the mechanism, for example with the aid of set screws, while the feed screw 58 passes therethrough without engagement as shown in FIG. 2. The end of screw 58 positioned outwardly from guide mechanism 64 is provided with a frustoconical portion which flares outwardly to a knurled heat 66. The frustoconical portion of screw 58 will, in the operative or clamping position of the device, be against the surface of the guide mechanism 64.

Guide mechanism 64 supports, on pins 68 and 70, third and fourth pairs of spaced bearings 72—72 and 74-74. Bearings 72 and 74 are mounted between a pair of parallel bearing support members 76 and 78 as shown in FIG. 1. The support members 76 and 78 are provided with cut-outs identical to the cut-outs in support members 44 and 46 whereby bearings 72—72 and 74—74 also extend into the spacing between the guide mechanisms 38 and 64.

If deemed necessary or desirable, means may be incorporated in the invention to facilitate opening of the work engaging portions. For example, a spring may be mounted between guide mechanisms 38 and 64 and about screw 58. Alternatively, a more positive method may be employed.

In operation, a cutting tool having the desired configuration is inserted in collet 16. The work engaging element of the invention; as defined by pairs of bearings 52, 54, 72 and 74; is then opened sufficiently to accommodate the pipe 10. This is achieved by rotating knob 36 in the counter-clockwise direction. The pipe 10 is then inserted between the bearings and the guide mechanisms 38 and 64 are closed by turning knob 66 in the clockwise direction. The operation of knob 66 results in rotation of feed screw 58 and the driving of guide mechanism 64 toward guide mechanism 56 along guide rods 60 and 62. After the pipe has been firmly engaged by the exterior surfaces on the four bearings, with the pipe extending past the clamping mechanisms toward the cutting tool to the necessary extent, the cutting tool is brought into contact with the pipe by rotation of feed screw 30. Rotation of screw 30 drives the frame 26 along guide rods 32 and 34 relative to the guide mechanisms 38 and 64 which are now engaging the stationary pipe. When the cutting tool is properly positioned relative to the work, as shown in phantom in FIG. 1, the motor is energized and the rapidly turning cutting tool is moved about the stationary pipe by rotating the entire tool assembly on the eight bearings. In rotating the assembly about the pipe on the bearings the main frame member 26 may be employed as a handle by the operator.

A particularly novel feature of the present invention resides in the use of eight individual bearing elements as the work engaging mechanism. The bearings are characterized by precision ground radial surfaces and thus the use of eight bearings insures parallelism of eight surfaces thereby precluding "walking" of the tool on the workpiece surface during use. The provision of eight points or regions of contact between the tool and work constitutes a substantial improvement over the prior art.

While the invention has been described for use in the preparation of the ends of pipe, tubing, conduit and their fittings for welding, soldering, brazing and other methods of fastening and fabrication, it has numerous other uses. For example, the invention may be employed to create a concentric land when an out-of-roundness condition exists. The invention is also capable of machining, on location, many types of concentric surfaces such as hand holes, valve seats, tail pieces and other ports or openings. Through use of the proper cutting tool insert, the present invention may also be employed to cut pipe in bank piping and it can further be employed to non-destructively cut or part seal welds of various types. In short, the present invention may be employed for a variety of material removal operations in environments where space is limited.

The present invention is characterized by little set-up time and ease of operation. Since the invention does not employ feed or speed controls, totally unskilled operators can produce higher quality work in less time than has previously been produced by skilled workers. In using the invention, the geometry of the cutter will define and produce the required configuration of the workpiece. It is also to be noted that a pressurized fluid such as, for example, air at 90 psi and 12 cfm is the only power requirement for the invention. Since there are no electrical connections, the invention is safe to employ in damp or wet areas. It is further to be noted that the invention may be readily disassembled and cleaned should it become contaminated or fouled.

While a preferred embodiment has been shown and described, it is to be understood that various modifications and substitutions may be made thereto without departing from the spirit and scope of the invention. Accordingly, it is to be understood that the present invention has been described by way of illustration and not limitation.

What is claimed is:

1. A cutting tool comprising:
rotary material removal means;
frame means, said removal means being rigidly mounted in said frame means;
adjustable clamp means supported from said frame means, said clamp means comprising:
a pair of jaw means;
first feed screw means, said first feed screw means passing through a first of said jaw means and engaging the second of said jaw means, said first feed screw means having an enlarged portion positioned outwardly from said first jaw means and abutting said first jaw means when an object is clamped between said jaw means;
a first pair of parallel guide rods, said first guide rods being connected to said first jaw means and passing through said second jaw means whereby rotation of said first feed screw means causes said first jaw means to move relative to said second jaw means along said first guide rods; and
object contacting means mounted on each of said jaw means, said contact means presenting precision ground surfaces to an object disposed between said jaw means, each of said contact means including two pair of bearings, the bearings of each pair being spacially displaced along an axis oriented parallel to the axis of rotation of said material removal means whereby the exterior radial surfaces of each pair of bearings defines two regions of contact with an object disposed between said jaw means, said contact regions being aligned along a line parallel to said axis of rotation; and
second feed screw means, said second screw means having a threaded portion which engages said frame means and an unthreaded portion which is coupled to one of said jaw means, the axis of said second feed screw means being oriented perpendicularly to the axis of rotation of said removal means; and
a second pair of parallel guide rods, said second pair of guide rods being connected to said one of said jaw means and passing through said frame means whereby rotation of said second feed screw produces relative motion between said jaw means and said frame means.

2. The apparatus of claim 1 wherein said material removal means comprises:
a fluid operated motor;
means mounting a cutting tool for rotation by said motor; and
means supporting said motor from said frame means.

* * * * *